(12) United States Patent
Kambe et al.

(10) Patent No.: US 6,399,120 B1
(45) Date of Patent: Jun. 4, 2002

(54) METHOD OF MANUFACTURING DOUGH FOR PREPARING YEAST-LEAVENED FOODS

(75) Inventors: Takao Kambe; Shigeru Okuno; Shinji Ishigami; Ryuji Uemura, all of Tokyo (JP)

(73) Assignee: Nisshin Flour Milling, Inc., Tokyo (JP)

( * ) Notice: Subject to any disclaimer, the term of this patent is extended or adjusted under 35 U.S.C. 154(b) by 18 days.

(21) Appl. No.: 09/617,113

(22) Filed: Jul. 14, 2000

(30) Foreign Application Priority Data

Jul. 23, 1999 (JP) ............................................. 11-209125
Jul. 23, 1999 (JP) ............................................. 11-209126

(51) Int. Cl.$^7$ ................................................. A21D 8/02
(52) U.S. Cl. ........................................ 426/27; 426/504
(58) Field of Search ................................ 426/18, 19, 20, 426/25, 27, 28, 391, 496, 504, 516

(56) References Cited

U.S. PATENT DOCUMENTS

| | | | |
|---|---|---|---|
| 4,544,563 A | * 10/1985 | Lechthaler | 426/276 |
| 5,147,675 A | * 9/1992 | Gage et al. | 426/549 |
| 5,310,569 A | * 5/1994 | Muller | 426/504 |
| 5,543,168 A | * 8/1996 | Yamasaki et al. | 426/557 |
| 6,207,214 B1 | * 3/2001 | Kim | 426/516 |

FOREIGN PATENT DOCUMENTS

| | | | |
|---|---|---|---|
| JP | 62-195250 | * | 8/1987 |
| JP | 40-9070269 | * | 5/1997 |

\* cited by examiner

*Primary Examiner*—Keith Hendricks
(74) *Attorney, Agent, or Firm*—Oblon, Spivak, McClelland, Maier & Neustadt, P.C.

(57) ABSTRACT

The present invention Is directed to a method of manufacturing dough for yeast-leavened foods, which includes kneading a portion, including farina, of starting materials under reduced pressure or atmospheric pressure, extruding the kneaded mixture under pressure, adding the remaining starting materials thereto for further kneading under atmospheric pressure so as to obtain kneaded dough, and then fermenting the resultant kneaded dough; a method of manufacturing dough for yeast-leavened foods, which includes kneading the entirety of the starting materials of the yeast-leavened foods under reduced pressure or atmospheric pressure, extruding the kneaded mixture under pressure, subsequently kneading the extruded mass so as to obtain kneaded dough, and then fermenting the resultant kneaded dough; and a method of manufacturing frozen dough for yeast-leavened foods, which include freezing of any of the thus obtained kneaded dough.

31 Claims, No Drawings

METHOD OF MANUFACTURING DOUGH FOR PREPARING YEAST-LEAVENED FOODS

TECHNICAL FIELD

The present invention relates to a method of manufacturing dough for preparing yeast-leavened foods, and to a method of manufacturing such dough in a frozen state. The method of the present invention enables provision of yeast-leavened foods endowed with excellent volume, internal structure, and texture upon eating.

BACKGROUND ART

Hitherto, there have been employed two typical methods for the manufacture of yeast-leavened foods such as breads. In one method, which is called a straight method, the entirety of the farina to be employed, such as wheat flour, and auxiliary materials are subjected to kneading together, and then to fermentation. The other method, which is called a sponge method, is a two-step method. In the first step, farina in an amount of 50–100 wt. % with respect to the entirety of the farina to be employed, yeast, and a portion of water are kneaded and fermented. In the second step, the remainder of the starting materials are added to the fermented mixture, and then the resultant mixture is subjected to another round of kneading and fermentation.

The straight method is advantageous in that it requires a short fermentation period. However, as compared with products obtained through the sponge method, yeast-leavened foods obtained through the straight method have poor properties in terms of volume, external appearance, internal structure, and texture upon eating. In contrast, yeast-leavened foods obtained through the sponge method have excellent properties in terms of volume, external appearance, internal structure, and texture upon eating; however, the sponge method is disadvantageous in that fermentation of sponge takes a relatively long time; i.e., 4 to 5 hours, and also requires large facilities and space.

Freezing enables long-term storage of dough for preparing yeast-leavened foods and thus is advantageous from the viewpoint of productivity. However, freezing should not adversely affects properties—such as external appearance and internal structure—of the yeast-leavened foods manufactured through use of the resultant frozen dough. Nevertheless, freezing of dough which has been fermented after kneading frequently causes damage to the yeast employed, thus deteriorating quality of the resultant yeast-leavened foods. Therefore, when frozen dough products are manufactured, the straight method is generally employed, and dough is shaped and frozen without undergoing fermentation. Due to the nature of this process, yeast-leavened foods prepared from such frozen dough exhibit poor volume, and unsatisfactory internal structure or texture-upon eating.

Accordingly, an object of the present invention is to provide a method of manufacturing dough for preparing yeast-leavened foods. Another object of the invention is to provide a method of manufacturing such dough in a frozen state.

DISCLOSURE OF THE INVENTION

The present inventors have carried out extensive studies in an attempt to attain the above objects, and have found that yeast-leavened foods endowed with excellent volume, external appearance, internal structure, and texture upon eating can be prepared through fermentation of the dough of the present invention, which is prepared by either method 1 in which a portion, including farina, of the starting materials of yeast-leavened foods is kneaded under reduced pressure, or kneaded under pressure and subsequently extruded under pressure, and after addition of the remaining starting materials thereto, is subjected to further kneading under atmospheric method 2 in which the entirety of the starting materials is kneaded under reduced pressure, or kneaded under atmospheric pressure and subsequently extruded under pressure, followed by kneading under atmospheric pressure. It should be noted that in neither method is fermentation performed between the two kneading steps. The present inventors have also found that when kneaded dough prepared as described above is frozen and the frozen dough is used for the manufacture of yeast-leavened foods, the resultant foods exhibit satisfactory properties in terms of external appearance, internal structure, etc. The present invention has been accomplished on the basis of these findings.

Accordingly, in one aspect of the present invention, there is provided a method of manufacturing dough for yeast-leavened foods, which comprises kneading a portion, including farina, of starting materials under reduced pressure, or kneaded it under atmospheric pressure; and subsequently extruding the kneaded mixture under pressure; adding the remaining starting materials thereto for further kneading under atmospheric pressure so as to obtain kneaded dough; and then fermenting the resultant kneaded dough.

In another aspect of the present invention, there is provided a method of manufacturing dough for yeast-leavened foods, which comprises kneading the entirety of the starting materials of the yeast-leavened foods under reduced pressure or pressure, or kneaded under pressure and subsequently extruded atmospheric pressure; extruding the kneaded mixture under pressure; subsequently kneading the extruded mass so as to obtain kneaded dough; and then fermenting the resultant kneaded dough.

In yet another aspect of the present invention, there is provided a method of manufacturing frozen dough for preparing yeast-leavened foods, which comprises freezing kneaded dough as described in relation to either of the above aspects.

According to the present invention, kneading is performed twice, and the kneading performed first is called the first kneading, and the kneading performed second is called the second kneading.

BEST MODE FOR CARRYING OUT THE INVENTION

In the present invention, yeast-leavened foods encompass any food which is primarily produced through mixing and kneading farina, yeast, and other ingredients, then fermenting and heating them. Thus, the yeast-leavened foods of the present invention include breads including sweet baked breads (such as an-pan (sweet bean-paste bun), batch loaf, roll bread, and French bread; the dough casing of Chinese-type manju such as niku-man and an-man; pizza crust; and yeast-leavened doughnuts. Of these products, the present invention is particularly suited for the manufacture of breads, inter alia, batch loaf, an-pan (sweet bean-paste bun), and roll bread.

The farina which is used in the present invention is suitably selected in accordance with the type of yeast-leavened food to be produced. For example, any of the following may be used: wheat flour, rice flour, barley flour, oat flour, corn flour, barnyard millet flour, millet flour, sorghums flour, common millet flour, and gellatinized forms of these farina. One or more of these may be used. Of these, wheat flour is preferred, and a flour blend primarily containing hard wheat flour and/or semi-hard wheat flour is particularly preferred. The amount of farina incorporated into dough is preferably 30–95 wt. %, more preferably 40–90 wt. %, although the amount may vary depending on the type of the yeast-leavened food to be produced.

The yeast used in the present invention may be either fresh yeast or dry yeast, so long as it is generally used for the manufacture of yeast-leavened foods. The amount of yeast to be added to farina, which may vary depending on the type of the yeast-leavened food, volume of carbon dioxide gas generated by the yeast, and so on, is usually 1–10 wt. %, particularly preferably 2–8 wt. %.

In the present invention, in addition to the aforementioned farina and yeast, other materials which are generally used in the manufacture of yeast-leavened foods may be used. For example, the following materials may be used: wheat-derived protein such as gluten; starches such as cornstarch and potato starch; eggs; yeast foods such as L-ascorbic acid, ammonium salts, calcium salts, oxidizing agents, and enzymes; baking powder; saccharides such as sugar, liquid sugar, and starch sugar; table salt; oils and fats such as butter, margarine, shortening, and lard; dairy products such as milk, skim milk, and condensed milk; flavorings; colorants; and water. Of these, L-ascorbic acid is preferably incorporated. The amount of L-ascorbic acid is 5–100 ppm, preferably 10–50 ppm, with respect to the entirety of the farina employed. Incorporation of L-ascorbic acid within the range of 5–100 ppm provides yeast-leavened foods of particularly excellent volume, internal structure, and texture upon eating.

The method of the present invention for the manufacture of dough for preparing yeast-leavened foods will next be described. The method encompasses the following two types of methods: a first method in which a portion, including farina, of the starting materials is subjected to the first kneading, and a second method in which the entirety of the starting materials is subjected to the first kneading.

In the case in which a portion of the starting materials is subjected to the first kneading, the "portion of the starting materials" may be constituted by farina, water, and L-ascorbic acid. The amount of farina to be subjected to the first kneading is preferably 40–100 wt. %, more preferably 50–100 wt. %, with respect to the entirety of the farina to be used. The amount of water to be subjected to the first kneading is preferably 40–100 wt. %, more preferably 50–95 wt. %, with respect to the entirety of water to be used. The amount of L-ascorbic acid to be subjected to the first kneading is preferably the entirety of L-ascorbic acid to be used. According to the present invention, since no fermentation step is required between the first kneading and the second kneading, yeast need not be included in the above-mentioned "portion of the starting materials."

The kneading machine is not particularly limited, so long as it is usable for the manufacture of yeast-leavened foods. For example, there may be used a vertical mixer, a horizontal mixer, an Artfex mixer, a slant mixer, a Tweedy mixer, a spiral mixer, or a Stephen mixer.

The first kneading is performed under reduced pressure or atmospheric pressure. In the case in which the first kneading is performed under reduced pressure, the pressure of the ambient air (atmosphere) is preferably not higher than 600 mmHg, more preferably not higher than 450 mmHg, most preferably not higher than 300 mmHg. When the first kneading is performed under reduced pressure, yeast-leavened foods endowed with excellent properties—in terms of volume, internal structure, texture upon eating, and so on—can be readily produced without the need of a subsequent pressure-extruding step and without performance of fermentation between kneading under reduced pressure and kneading under atmospheric pressure. This effect is particularly notable when the pressure is 300 mmHg or less. To create such a reduced pressure, a vacuum pump may be employed.

The kneading conditions, including the revolutions-per-minute (speed) of mixer, mixing time, and mixing temperature, are appropriately determined in accordance with the type of yeast-leavened food. When the first kneading is performed under reduced pressure, preferably low-speed mixing is performed for a relatively long time (e.g., 5–10 minutes), whereas when the first kneading is performed under atmospheric pressure, preferably, subsequent to low-speed mixing, high-speed mixing is performed for 1–5 minutes.

In the case in which the first kneading is performed under atmospheric pressure, pressure-extruding is performed after completion of the first kneading. As used herein, "pressure-extruding" refers to a sequential processing involving feeding into an extruder a starting material mixture that has undergone the first kneading; applying pressure so as to transfer the mixture within the extruder; and discharging the mixture out of the extruder. In the present invention, the method for applying pressure and transferring the mixture is not particularly limited, and any method employing a ram, a gear pump, or a screw may be used. The pressure-extruding apparatus is not particularly limited so long as it is usable for extruding food with the application of pressure. Examples of such apparatus include a uniaxial or biaxial screw-type pressure-extruder, a meat chopper, a mincing machine, a dough pump, a noodle-dough extruder, and food processing machines having a structure similar to that of the screw-type pressure-extruder. Of these, a meat chopper is particularly preferred.

The pressure applied during pressure-extrusion is preferably 0.1–100 kg/cm$^2$, more preferably 0.3–40 kg/cm$^2$, most preferably 0.5–20 kg/cm$^2$. The pressure-extrusion processing enables manufacture of yeast-leavened foods endowed with excellent volume, external appearance, internal structure, and texture upon eating, while eliminating the step of fermentation between the first kneading under atmospheric pressure and the second kneading. This effect is particularly notable when the pressure during the pressure-extrusion processing is 0.5–20 kg/cm$^2$. The time during which the pressure-extrusion processing is performed is not particularly limited. Preferably, the pressure-extrusion processing time is 5–120 seconds, and a processing time of 10–60 seconds is particularly preferred. The temperature at which the pressure-extrusion processing is performed is preferably about the same as the kneading temperature.

After completion of the first kneading under reduced pressure, or after pressure-extrusion which is performed subsequent to the first kneading under atmospheric pressure, the remaining starting materials are added and the second kneading is performed, to thereby prepare kneaded dough. Among the remaining starting materials, oils and fats, such as shortening, may be added at any time during the second kneading. Conditions for the second kneading may be appropriately determined in accordance with the type of the yeast-leavened food to be produced. Preferably, 2-step kneading is performed; first low-speed kneading, then high-speed kneading. According to the method of the present invention, yeast-leavened foods endowed with excellent properties in terms of volume, internal structure, and texture upon eating can be obtained without performance of a fermentation step between the first and the second kneading, leading to cutting of the manufacture time.

The obtained kneaded dough is subjected to customary steps as needed: a certain period of floor time, cutting, rolling, a certain period of bench time, and forming. The thus-formed kneaded mixture is fermented to thereby yield the dough for preparing yeast-leavened foods. The fermentation step corresponds to proofing performed in the manufacture of ordinary bread. Conditions for fermentation may be appropriately determined in accordance with the type of the yeast-leavened food; for example, in the case of the manufacture of bread, a temperature of 30–45° C. and a humidity of 75–95%, in the case of the manufacture of yeast-leavened doughnuts, a temperature of 30–45° C. and a humidity of 50–70%, and in the case of the manufacture of Chinese-type manju, a temperature of 50–60° C. and a humidity of 40–60%.

After completion of fermentation, the dough is processed with heat, yielding a yeast-leavened food. The method for processing with heat may be suitably selected in accordance with the type of the yeast-leavened food. For example, breads may be produced through baking for 15–60 minutes in an oven set at 190–250° C., yeast-leavened doughnuts may be produced through deep-frying for 0.5–10 minutes at 160–210° C., and Chinese-type manju may be produced through steaming for 1–15 minutes with water vapor of 90–120° C.

Next, the method of subjecting all the starting materials to the first kneading will be described. In this method, oils and fats, such as shortening, may be added at any time during the course of the first kneading. The kneading machine may be the same one used for performing the method in which a portion of the starting materials is subjected to the first kneading. When kneading is performed under reduced pressure, the pressure of the ambient air (atmosphere) is preferably not higher than 600 mmHg, more preferably not higher than 450 mmHg, most preferably not higher than 300 mmHg. When the kneading is performed under reduced pressure, yeast-leavened foods endowed with excellent properties—in terms of volume, internal structure, texture upon eating, and so on—can be produced without the need of a subsequent pressure-extruding step and without performance of fermentation between kneading under reduced pressure and kneading under atmospheric pressure. This effect is particularly notable when the pressure is 300 mmHg or less. To create such a reduced pressure, a vacuum pump may be employed.

The kneading conditions, including the revolutions-per-minute (speed) of mixer, mixing time, and mixing temperature, are appropriately determined in accordance with the type of yeast-leavened food. Preferable kneading conditions are the same as those described for the case in which a portion of the starting materials is subjected to the first kneading.

In the case in which the first kneading is performed under atmospheric pressure, the pressure applied during the subsequent pressure-extruding is preferably 0.1–100 kg/cm$^2$, more preferably 0.3–40 kg/cm$^2$, most preferably 0.5–20 kg/cm$^2$. The pressure-extrusion processing enables manufacture of yeast-leavened foods endowed with excellent properties in terms of volume, external appearance, internal structure, and texture upon eating, while eliminating the step of fermentation between the first kneading under atmospheric pressure and the second kneading. This effect is particularly notable when the pressure during the pressure-extrusion processing is 0.5–20 kg/cm$^2$. The time and temperature for the pressure-extrusion processing are the same as those described in relation to the case in which a portion of the starting materials is subjected to the first kneading.

After completion of the first kneading under reduced pressure, or after pressure-extrusion which is performed subsequent to the first kneading under atmospheric pressure, the second kneading is performed. Conditions for the second kneading are the same as those for the second kneading described in relation to the case in which a portion of the starting materials is subjected to the two-step kneading. The obtained kneaded dough is subjected to customary steps, such as a bench time, as needed, followed by fermentation.

The method for the manufacture of a frozen dough for preparing yeast-leavened foods comprises freezing of the above-prepared kneaded dough. The kneaded dough to be frozen may be dough prepared by the method in which a portion of the starting materials is subjected to kneading, or dough prepared by the method in which all the starting materials are together subjected to the first kneading. From the viewpoint of improvement in quality of yeast-leavened foods, the kneaded dough is preferably frozen rapidly in a freezer or like apparatus at a temperature of –30° C. or less. The storage temperature after the food products have been rapidly frozen is not particularly limited, so long as the frozen state of the products can be satisfactorily maintained. Also, in the production of yeast-leavened foods, which requires, for example, floor time, cutting, rolling, and bench time, freezing of kneaded dough is preferably performed after the dough has undergone these steps, so as to facilitate fermentation, processing with heat, and other steps which are to be performed after thawing of the frozen dough. When frozen dough is thawed preferably at room temperature and is then subjected to fermentation and thermal processing, there can be obtained yeast-leavened foods endowed with almost the same excellent quality as obtainable from unfrozen, fresh dough.

EXAMPLES

The present invention will next be described in detail by way of examples, which should not be construed as limiting the invention thereto.

Example 1

Batch loaves were prepared through kneading, under pressure, of a portion of the starting materials.

To 70 parts by weight of wheat flour (CAMELLIA, product of Nisshin Flour Milling Co.; crude protein content: 11.8 wt. %, this wheat flour was also used in the subsequent Examples) were added 40 parts by weight of water and 0.002 parts by weight of L-ascorbic acid, and the resultant mixture was kneaded for 2 minutes at low speed, then for 2 minutes at high speed, both under atmospheric pressure. The kneaded mixture was fed into a pressure-extruder ("MEAT-CHOPPER LC 12 S1," manufactured by Hitachi Koki K.K., this extruder was also used in the subsequent Examples) for mincing. To the minced mixture were added the following ingredients: wheat flour (30 parts by weight), yeast ("REGULAR YEAST," product of Oriental Yeast Kogyo K.K., this yeast was also used in the subsequent Examples) (3.5 parts by weight), table salt (2 parts by weight), sugar (6 parts by weight), skim milk (3 parts by weight), and water (27 parts by weight). The resultant mixture was kneaded for 2 minutes at low speed, then for 5 minutes at high speed, both under atmospheric pressure. Four parts by weight of shortening were added thereto, followed by kneading for 3 minutes at high speed, to thereby yield 27° C. bread dough.

After expiry of a floor time of 30 minutes, the bread dough was cut into portions of 250 g, and rolled. A bench time of 20 minutes was effected, followed by forming with a molder, and fermentation at 38° C. at a humidity of 85%. The thus-obtained dough was baked for 30 minutes in a 210° C. oven, to thereby yield batch loaves.

Comparative Example 1

Batch loaves were prepared through the straight method.

The following ingredients were added to 100 parts by weight of wheat flour: L-ascorbic acid (0.002 parts by weight), yeast (3.5 parts by weight), table salt (2 parts by weight), sugar (6 parts by weight), skim milk (3 parts by weight), and water (67 parts by weight). The resultant mixture was kneaded for 4 minutes at low speed, then for 5 minutes at high speed, both under atmospheric pressure. Shortening (4 parts by weight) was added thereto, followed by kneading for 2 minutes at low speed, then 5 minutes at high speed, to thereby yield 27° C. bread dough. The subsequent process was similar to that of Example 1, and batch loaves were obtained.

Comparative Example 2

Batch loaves were prepared through the straight method.

To 70 parts by weight of wheat flour were added water (40 parts by weight) and L-ascorbic acid (0.002 parts by weight). The resultant mixture was kneaded for 2 minutes at low speed, then for 2 minutes at high speed, both under atmospheric pressure. To the kneaded mixture, the following ingredients were added: wheat flour (30 parts by weight), yeast (3.5 parts by weight), table salt (2 parts by weight), sugar (6 parts by weight), skim milk (3 parts by weight), and water (27 parts by weight). The resultant mixture was kneaded for 2 minutes at low speed, then for 5 minutes at high speed, both under atmospheric pressure. Shortening (4 parts by weight) was added thereto, followed by kneading for 3 minutes at high speed, to thereby yield 27° C. bread dough.

The subsequent process was similar to that of Example 1, and batch loaves were obtained.

Test Example 1

After measurement of the volume of each of the batch loaves obtained in Example 1 and Comparative Examples 1 and 2, the external appearance, internal structure, tactile sensation, and texture upon eating were evaluated by 10 panelists. The evaluation standards are shown in Table 1. The volume of each loaf, and averaged ratings of respective evaluation items are shown in Table 2. Overall evaluation of each loaf, which is represented by a total of the averaged ratings assigned to all evaluation items, is shown in Table 2.

TABLE 1

| Evaluation item | Rating | Remarks |
| --- | --- | --- |
| External characteristics | 5 points | Very smooth crust; extremely good volume; golden baked color |
| | 4 points | Smooth crust; very good volume; close to golden baked color |
| | 3 points | Slight lack of smoothness; good volume; slightly dull baked color |
| | 2 points | Slightly rough crust; slightly poor volume; dull baked color |
| | 1 point | Rough crust; poor volume; dark baked color |

TABLE 1-continued

| Evaluation item | Rating | Remarks |
| --- | --- | --- |
| Internal structure | 5 points | Open grain with extremely thin cell walls |
| | 4 points | Open grain with very thin cell walls |
| | 3 points | Open grain with thin cell walls |
| | 2 points | Compact grain with slightly thick cell walls |
| | 1 point | Compact grain with thick cell walls |
| Texture | 5 points | Extremely soft |
| | 4 points | Very soft |
| | 3 points | Soft |
| | 2 points | Slightly firm |
| | 1 point | Firm |
| Eating qualities | 5 points | Extremely soft and moist |
| | 4 points | Very soft and moist |
| | 3 points | Soft and moist |
| | 2 points | Slightly tough and crumbly |
| | 1 point | Tough and crumbly |

TABLE 2

| | | Example 1 | Comparative Example 1 | Comparative Example 2 |
| --- | --- | --- | --- | --- |
| Volume of bread (cc) | | 2100 | 1950 | 1960 |
| Quality evaluation | External characteristics | 4.8 | 3.8 | 3.6 |
| | Internal structure | 4.6 | 4.0 | 3.8 |
| | Texture | 4.8 | 3.6 | 3.8 |
| | Eating qualities | 4.2 | 3.4 | 3.6 |
| | Overall evaluation | 18.4 | 14.8 | 14.8 |

As compared with the batch loaves of Comparative Examples 1 or 2, those of Example 1 exhibited a remarkable volume, and were found to be endowed with excellent properties in terms of external characteristics, internal structure, texture, and eating qualities: among these four evaluation items, the external characteristics and texture were particularly excellent. The eating qualities were also improved. These results confirm the effect of the method of the present invention.

Example 2

An-pan buns (sweet bean-paste buns) were prepared through kneading, under pressure, a portion of the starting materials.

To 70 parts by weight of wheat flour were added water (40 parts by weight) and L-ascorbic acid (0.002 parts by weight), and the resultant mixture was kneaded for 2 minutes at low speed, then for 2 minutes at high speed, both under atmospheric pressure. The kneaded mixture was fed into a pressure-extruder for mincing. To the minced mixture were added the following ingredients: wheat flour (30 parts by weight), yeast (5 parts by weight), table salt (1.2 parts by weight), sugar (20 parts by weight), skim milk (3 parts by weight), whole egg (10 parts by weight), and water (7 parts by weight). The resultant mixture was kneaded for 4 minutes at low speed, then for 5 minutes at high speed, both under atmospheric pressure. Shortening (10 parts by weight) was added thereto, followed by kneading for 5 minutes at high speed, to thereby yield 28° C. an-pan dough. After expiry of a floor time of 40 minutes, the an-pan dough was cut into portions of 50 g, and rolled. A bench time of 20 minutes was effected, and subsequently, an (sweet bean paste) was encased in the dough and allowed to ferment at 38° C. and a humidity of 85%. The thus-obtained an-encasing dough was baked for 10 minutes in a 200° C. oven, to thereby yield an-pan buns.

Comparative Example 3

An-pan buns (sweet bean-paste bun) were prepared through the straight method.

To 100 parts by weight of wheat flour, the following ingredients were added: L-ascorbic acid (0.002 parts by weight), yeast (5 parts by weight), table salt (1.2 parts by weight), sugar (20 parts by weight), skim milk (3 parts by weight), whole egg (10 parts by weight), and water (47 parts by weight). The resultant mixture was kneaded for 5 minutes at low speed, then for 6 minutes at high speed, both under atmospheric pressure shortening (10 parts by weight) was added thereto, followed by kneading for 2 minutes at low speed, then 5 minutes at high speed, to thereby yield 28° C. an-pan dough. The subsequent process was similar to that of Example 2, and an-pan buns were obtained.

Test Example 2

For each of the an-pan buns obtained in Example 2 and Comparative Example 3, the external characteristics, internal structure, texture, and eating qualities were evaluated in a manner similar to that of Test Example 1. The averaged ratings of respective evaluation items are shown in Table 3. Overall evaluation of each bun, which is represented by a total of the averaged ratings assigned to all the evaluation items, is shown in Table 3.

TABLE 3

|  |  | Example 2 | Comparative Example 3 |
|---|---|---|---|
| Quality evaluation | External characteristics | 4.8 | 3.6 |
|  | Internal structure | 4.6 | 3.2 |
|  | Texture | 4.8 | 3.8 |
|  | Eating qualities | 4.9 | 3.6 |
|  | Overall evaluation | 19.1 | 14.2 |

As compared with the buns of Comparative Example 3, those of Example 2 were found to be endowed with excellent properties in terms of external characteristics, internal structure, texture, and eating qualities: among these four evaluation items, the external characteristics, texture, and eating qualities were found to be particularly excellent. Also, the internal structure was noticeably improved. These results confirm the effect of the method of the present invention.

Example 3

Butter roll dough was prepared through kneading, under pressure, a portion of the starting materials, and frozen. Through use of the resultant frozen dough, butter rolls were produced.

To 70 parts by weight of wheat flour were added water (40 parts by weight) and L-ascorbic acid (0.002 parts by weight), and the resultant mixture was kneaded for 2 minutes at low speed, then for 2 minutes at high speed, both under atmospheric pressure. The kneaded mixture was fed into a pressure-extruder for mincing. To the minced mixture were added the following ingredients: wheat flour (30 parts by weight), yeast (5 parts by weight), table salt (1.8 parts by weight), sugar (10 parts by weight), skim milk (3 parts by weight), whole egg (10 parts by weight), and water (8 parts by weight). The resultant mixture was kneaded for 2 minutes at low speed, then for 5 minutes at high speed, both under atmospheric pressure. Shortening (10 parts by weight) was added thereto, followed by kneading for 5 minutes at high speed, to thereby yield 26° C. butter roll dough. After expiry of a floor time of 20 minutes, the butter roll dough was cut into portions of 40 g, and rolled. A bench time of 20 minutes was effected, and subsequently, each portion of the dough was rolled. Then each portion of the dough was completely frozen within 30 minutes in a rapid freezer (−40° C.) and stored in a freezer at a temperature of −20° C. After three months, each frozen portion of the butter roll dough was placed on a baking sheet, thawed for 60 minutes at room temperature, and allowed to ferment for 40 minutes at 35° C. and a humidity of 80%. The thus-obtained portions of butter roll dough were baked for 10 minutes in a 200° C. oven, to thereby yield butter rolls.

Comparative Example 4

Butter roll dough was prepared through the straight method, and the dough was frozen. Butter rolls were prepared from the frozen dough.

To 100 parts by weight of wheat flour, the following ingredients were added: L-ascorbic acid (0.002 parts by weight), yeast (5 parts by weight), table salt (1.8 parts by weight), sugar (10 parts by weight), skim milk (3 parts by weight), whole egg (10 parts by weight), and water (48 parts by weight). The resultant mixture was kneaded for 2 minutes at low speed, then for 6 minutes at high speed, both under atmospheric pressure. Shortening (10 parts by weight) was added thereto, followed by kneading for 2 minutes at low speed, then 5 minutes at high speed, to thereby yield 26° C. butter roll dough. The subsequent process was similar to that of Example 3, and butter rolls were obtained.

Test Example 3

After measurement of the volume of each of the butter rolls obtained in Example 3 and Comparative Example 4, the external characteristics, internal structure, texture, and eating qualities were evaluated in a manner similar to that of Test Example 1. The volume of each butter roll, and averaged ratings of respective evaluation items are shown in Table 4. Overall evaluation of each butter roll, which is represented by EL total of the averaged ratings assigned to all the evaluation items, is shown in Table 4.

TABLE 4

|  |  | Example 3 | Comparative Example 4 |
|---|---|---|---|
| Volume of bread (cc) |  | 190 | 165 |
| Quality evaluation | External characteristics | 4.4 | 3.8 |
|  | Internal structure | 4.2 | 3.2 |
|  | Texture | 4.6 | 3.0 |
|  | Eating qualities | 4.0 | 2.8 |
|  | Overall evaluation | 17.2 | 12.8 |

As compared with the butter rolls of Comparative Example 4, those of Example 3 were found to be endowed with excellent properties in terms of external characteristics, internal structure, texture, and eating qualities: among these four evaluation items, the texture was particularly excellent. Also, the eating qualities was noticeably improved. These results confirm that yeast-leavened foods of excellent quality can be obtained through use of the frozen dough prepared by the method of the present invention.

Example 4

Batch loaves were prepared through kneading, under pressure, the entirety of the starting materials.

To 100 parts by weight of wheat flour, the following ingredients were added: L-ascorbic acid (0.002 parts by weight), yeast (3.5 parts by weight), table salt (2 parts by weight), sugar (6 parts by weight), skim milk (3 parts by weight), shortening (4 parts by weight), and water (67 parts by weight). The resultant mixture was kneaded for 2 minutes at low speed, then for 2 minutes at high speed, both under atmospheric pressure. Shortening (4 parts by weight) was added thereto, followed by kneading for 3 minutes at high speed. The kneaded mixture was fed into a pressure-extruder for mincing. The minced mixture was kneaded for 2 minutes at low speed, then for 8 minutes at high speed, to thereby yield 27° C. bread dough. The subsequent process was similar to that of Example 1, and batch loaves were obtained.

Comparative Example 5

Batch loaves were prepared through the straight method.

To 100 parts by weight of wheat flour, the following ingredients were added: L-ascorbic acid (0.002 parts by weight), yeast (3.5 parts by weight), table salt (2 parts by weight), sugar (6 parts by weight), skim milk (3 parts by weight), and water (67 parts by weight). The resultant mixture was kneaded for 4 minutes at low speed, then for 5 minutes at high speed, both under atmospheric pressure. Shortening (4 parts by weight) was added thereto, followed by kneading for 2 minutes at low speed, then for 5 minutes at high speed, to thereby yield 27° C. bread dough. The subsequent process was similar to that of Example 1, and batch loaves were obtained.

Test Example 4

After measurement of the volume of each of the batch loaves obtained in Example 4 and Comparative Example 5, the external characteristics, internal structure, texture, and eating qualities were evaluated in a manner similar to that of Test Example 1. The volume of each loaf, and averaged ratings of respective evaluation items are shown in Table 5. Overall evaluation of each loaf, which is represented by a total of the averaged ratings assigned to all the evaluation items, is shown in Table 5.

TABLE 5

| | | Example 4 | Comparative Example 5 |
|---|---|---|---|
| Volume of bread (cc) | | 2050 | 1950 |
| Quality evaluation | External characteristics | 4.6 | 3.8 |
| | Internal structure | 4.8 | 4.0 |
| | Texture | 4.8 | 3.6 |
| | Eating qualities | 4.4 | 3.4 |
| | Overall evaluation | 18.6 | 14.8 |

As compared with the batch loaves of Comparative Example 5, those of Example 4 exhibited a remarkable volume, and were found to be endowed with excellent properties in terms of external characteristics, internal structure, texture, and eating qualities: among these four evaluation items, the internal structure and texture were particularly excellent. These results confirm the effect of the method of the present invention.

Example 5

Batch loaves were prepared through kneading, under reduced pressure, a portion of the starting materials.

To 70 parts by weight of wheat flour was added water (40 parts by weight), followed by kneading for 10 minutes at low speed under a pressure of 300 mmHg to thereby prepare a 24° C. kneaded mixture. To the kneaded mixture, the following ingredients were added: wheat flour (30 parts by weight), yeast (3 parts by weight), table salt (2 parts by weight), sugar (6 parts by weight), skim milk (3 parts by weight), and water (27 parts by weight). The resultant mixture was kneaded for 2 minutes at low speed, then for 5 minutes at high speed, both under atmospheric pressure. Shortening (4 parts by weight) was added thereto, followed by kneading for 3 minutes at high speed, to thereby yield 27° C. bread dough. After expiry of a floor time of 20 minutes, the bread dough was cut into portions of 250 g, and rolled. A bench time of 20 minutes was effected, followed by forming with a molder, and fermentation at 38° C. and a humidity of 85%. The thus-obtained dough was baked for 30 minutes in a 210° C. oven, to thereby yield batch loaves.

Comparative Example 6

Batch loaves were prepared through the straight method.

To 100 parts by weight of wheat flour, the following ingredients were added; yeast (3 parts by weight), table salt (2 parts by weight), sugar (6 parts by weight), skim milk (3 parts by weight), and water (67 parts by weight). The resultant mixture was kneaded for 4 minutes at low speed, then for 5 minutes at high speed, both under atmospheric pressure. Shortening (4 parts by weight) was added thereto, followed by kneading for 2 minutes at low speed, then for 5 minutes at high speed, to thereby yield 27° C. bread dough. The subsequent process was similar to that of Example 5, and batch loaves were obtained.

Comparative Example 7

Batch loaves were prepared through the straight method.

To 70 parts by weight of wheat flour was added water (40 parts by weight), followed by kneading for 10 minutes at low speed under atmospheric pressure to thereby prepare 24° C. kneaded mixture. To the kneaded mixture, the following ingredients were added: wheat flour (30 parts by weight), yeast (3 parts by weight), table salt (2 parts by weight), sugar (6 parts by weight), skim milk (3 parts by weight), and water (27 parts by weight). The resultant mixture was kneaded for 2 minutes at low speed, then for 5 minutes at high speed, both under atmospheric pressure. Shortening (4 parts by weight) was added thereto, followed by kneading for 3 minutes at high speed, to thereby yield 27° C. bread dough. The subsequent process was similar to that of Example 5, and batch loaves were obtained.

Test Example 5

After measurement of the volume of each of the batch loaves obtained in Example 5 and Comparative Examples 6 and 7, the external characteristics, internal structure, texture, and eating qualities were evaluated in a manner similar to that of Test Example 1. The volume of each loaf, and averaged ratings of respective evaluation items are shown in Table 6. Overall evaluation of each loaf, which is represented by a total of the averaged ratings assigned to all the evaluation items, is shown in Table 6.

TABLE 6

|  |  | Example 5 | Comparative Example 6 | Comparative Example 7 |
|---|---|---|---|---|
| Volume of bread (cc) | | 2060 | 1840 | 1850 |
| Quality evaluation | External characteristics | 4.6 | 3.4 | 3.4 |
| | Internal structure | 4.8 | 3.8 | 3.6 |
| | Texture | 4.4 | 3.8 | 3.6 |
| | Eating qualities | 5.0 | 3.2 | 3.4 |
| | Overall evaluation | 18.8 | 14.2 | 14.0 |

As compared with the batch loaves of Comparative Examples 6 and 7, those of Example 5 exhibited a remarkable volume, and were found to be endowed with excellent properties in terms of external characteristics, internal structure, texture, and eating qualities: among these four evaluation items, the internal structure and eating qualities were particularly excellent. Also, the external characteristics was noticeably improved. These results confirm the effect of the method of the present invention.

Example 6

An-pan buns (sweet bean-paste buns) were prepared through kneading, under reduced pressure, a portion of the starting materials.

To 70 parts by weight of wheat flour were added water (40 parts by weight) and L-ascorbic acid (0.002 parts by weight), followed by kneading for 10 minutes at low speed under a pressure of 300 mmHg to thereby prepare a 24° C. kneaded mixture. To the kneaded mixture, the following ingredients were added: wheat flour (30 parts by weight), yeast (5 parts by weight), table salt (1.2 parts by weight), sugar (20 parts by weight), skim milk (3 parts by weight), whole egg (10 parts by weight), and water (7 parts by weight). The resultant mixture was kneaded for 4 minutes at low speed, then for 5 minutes at high speed, both under atmospheric pressure. Shortening (10 parts by weight) was added thereto, followed by kneading for 5 minutes at high speed, to thereby yield 28° C. an-pan dough. After expiry of a floor time of 30 minutes, the an-pan dough was cut into portions of 50 g, and rolled. A bench time of 20 minutes was effected, and subsequently, an (sweet bean paste) was encased in the dough and allowed to ferment at 38° C. and a humidity of 85%. The thus-obtained an-encasing dough was baked for 10 minutes in a 200° C. oven, to thereby yield an-pan buns.

Comparative Example 8

An-pan buns (sweet bean-paste buns) were prepared through the straight method.

To 100 parts by weight of wheat flour, the following ingredients were added: L-ascorbic acid (0.002 parts by weight), yeast (5 parts by weight), table salt (1.2 parts by weight), sugar (20 parts by weight), skim milk (3 parts by weight), whole egg (10 parts by weight), and water (47 parts by weight). The resultant mixture was kneaded for 5 minutes at low speed, then for 6 minutes at high speed, both under atmospheric pressure. Shortening (10 parts by weight) was added thereto, followed by kneading for 2 minutes at low speed, then 5 minutes at high speed, to thereby yield 28° C. an-pan dough. The subsequent process was similar to that of Example 6, and an-pan buns were obtained.

Test Example 6

For each of the an-pan buns obtained in Example 6 and Comparative Example 8, the external characteristics, internal structure, texture, and eating qualities were evaluated in a manner similar to that of Test Example 1. The averaged ratings of respective evaluation items are shown in Table 7. Overall evaluation of each bun, which is represented by a total of the averaged ratings assigned to all the evaluation items, is shown in Table 7.

TABLE 7

|  |  | Example 6 | Comparative Example 8 |
|---|---|---|---|
| Quality evaluation | External characteristics | 4.8 | 3.6 |
| | Internal structure | 4.6 | 3.2 |
| | Texture | 4.8 | 3.8 |
| | Eating qualities | 4.9 | 3.0 |
| | Overall evaluation | 19.1 | 13.6 |

As compared with the buns of Comparative Example 8, those of Example 6 were found to be endowed with excellent properties in terms of external characteristics, internal structure, texture, and eating qualities: among these four evaluation items, the external characteristics, internal structure, and eating qualities were noticeably improved. These results confirm the effect of the method of the present invention.

Example 7

Butter roll dough was prepared through kneading, under reduced pressure, a portion of the starting materials, and the dough was frozen. Butter rolls were produced from the frozen dough.

To 70 parts by weight of wheat flour were added water (40 parts by weight) and L-ascorbic acid (0.002 parts by weight), followed by kneading for 10 minutes at low speed under a pressure of 300 mmHg to thereby prepare a 24° C. kneaded mixture. To the kneaded mixture, the following ingredients were added: wheat flour (30 parts by weight), yeast (5 parts by weight), table salt (1.8 parts by weight), sugar (10 parts by weight), skim milk (3 parts by weight), whole egg (10 parts by weight), and water (8 parts by weight). The resultant mixture was kneaded for 2 minutes at low speed, then for 5 minutes at high speed, both under atmospheric pressure. Shortening (10 parts by weight) was added thereto, followed by kneading for 5 minutes at high speed, to thereby yield 26° C. butter roll dough. After expiry of a floor time of 20 minutes, the butter roll dough was cut into portions of 40 g, and rolled. A bench time of 20 minutes was effected, and subsequently, each portion of the dough was rolled. Subsequently, each portion of the dough was completely frozen in 30 minutes in a rapid freezer (−40° C.) and stored in a freezer at a temperature of −20° C. After three months, each frozen portion of the butter roll dough was placed on a baking sheet, thawed for 60 minutes at room temperature, and allowed to ferment for 40 minutes at 35° C. and a humidity of 80%. The thus-obtained portions of butter roll dough were baked for 10 minutes in a 200° C. oven, to thereby yield butter rolls.

Comparative Example 9

Butter roll dough was prepared through the straight method, and the dough was frozen. Butter rolls were produced from the frozen dough.

To 100 parts by weight of wheat flour, the following ingredients were added: L-ascorbic acid (0.002 parts by weight), yeast (5 parts by weight), table salt (1.8 parts by weight), sugar (10 parts by weight), skim milk (3 parts by weight), whole egg (10 parts by weight), and water (48 parts by weight). The resultant mixture was kneaded for 2 minutes at low speed, then for 6 minutes at high speed, both under atmospheric pressure. Shortening (10 parts by weight) was added thereto, followed by kneading for 2 minutes at low speed, then 5 minutes at high speed, to thereby yield 26° C. butter roll dough. The subsequent process was similar to that of Example 7, and butter rolls were obtained.

Test Example 7

After measurement of the volume of each of the butter rolls obtained in Example 7 and Comparative Example 9, the external characteristics, internal structure, texture, and eating qualities were evaluated in a manner similar to that of Test Example 1. The volume of each butter roll, and averaged ratings of respective evaluation items are shown in Table 8. Overall evaluation of each butter roll, which is represented by a total of the averaged ratings assigned to all the evaluation items, is also shown in Table 8.

TABLE 8

| | | Example 7 | Comparative Example 9 |
|---|---|---|---|
| Volume of bread (cc) | | 185 | 160 |
| Quality evaluation | External characteristics | 4.6 | 3.4 |
| | Internal structure | 4.4 | 2.8 |
| | Texture | 4.2 | 3.8 |
| | Eating qualities | 4.0 | 3.0 |
| | Overall evaluation | 17.2 | 13.0 |

As compared with the butter rolls of Comparative Example 9, those of Example 7 were found to exhibit a remarkable volume, and to be endowed with excellent properties in terms of external characteristics, internal structure, texture, and eating qualities: among these four evaluation items, the external characteristics was particularly excellent. Also, the internal structure was noticeably improved. These results confirm that yeast-leavened foods of excellent quality can be obtained through use of the frozen dough prepared by the method of the present invention.

Example 8

Batch loaves were prepared through kneading, under reduced pressure, the entirety of the starting materials.

To 100 parts by weight of wheat flour, the following ingredients were added: yeast (3 parts by weight), table salt (2 parts by weight), sugar (6 parts by weight), skim milk (3 parts by weight), shortening (4 parts by weight), and water (67 parts by weight), followed by kneading for 10 minutes at low speed under a pressure of 300 mmHg to thereby prepare a 24° C. kneaded mixture. The kneaded mixture was kneaded for 2 minutes at low speed, then for 8 minutes at high speed, both under atmospheric pressure, to thereby yield 27° C. bread dough. The subsequent process was similar to that of Example 5, and batch loaves were obtained.

Comparative Example 10

Batch loaves were prepared through the straight method.

To 100 parts by weight of wheat flour, the following ingredients were added: yeast (3 parts by weight), table salt (2 parts by weight), sugar (6 parts by weight), skim milk (3 parts by weight), shortening (4 parts by weight), and water (67 parts by weight). The resultant mixture was kneaded for 6 minutes at low speed, then for 8 minutes at high speed, both under atmospheric pressure, to thereby yield 27° C. bread dough. The subsequent process was similar to that of Example 5, and batch loaves were obtained.

Test Example 8

After measurement of the volume of each of the batch loaves obtained in Example 8 and Comparative Example 10, the external characteristics, internal structure, texture, and eating qualities were evaluated in a manner similar to that of Test Example 1. The volume of each loaf, and averaged ratings of respective evaluation items are shown in Table 9. Overall evaluation of each loaf, which is represented by a total of the averaged ratings assigned to all the evaluation items, is also shown in Table 9.

TABLE 9

| | | Example 8 | Comparative Example 10 |
|---|---|---|---|
| Volume of bread (cc) | | 2040 | 1800 |
| Quality evaluation | External characteristics | 4.4 | 3.4 |
| | Internal structure | 4.8 | 3.6 |
| | Texture | 4.6 | 3.6 |
| | Eating qualities | 4.8 | 3.2 |
| | Overall evaluation | 18.6 | 13.8 |

As compared with the batch loaves of Comparative Example 10, those of Example 8 were found to be endowed with excellent properties in terms of external characteristics, internal structure, texture, and eating qualities: among these four evaluation items, the eating qualities were noticeably improved. These results confirm the effect of the method of the present invention.

INDUSTRIAL APPLICABILTY

The method according to the present invention facilitates manufacture of dough for preparing yeast-leavened foods endowed with excellent quality in terms of volume, external characteristics, internal structure, eating qualities, etc.; and such dough in a frozen state.

What is claimed is:

1. A method of manufacturing dough for yeast-leavened foods, which comprises:
   (1) (i) kneading a portion of starting materials comprising at least farina under reduced pressure to form a kneaded mass; or
      (ii) kneading a portion of starting materials comprising at least farina under atmospheric pressure and subsequently extruding the kneaded mixture under pressure to form an extruded mass;
   (2) adding remaining starting materials to said kneaded mass or said extruded mass and further kneading under atmospheric pressure to obtain kneaded dough; and then
   (3) fermenting said kneaded dough, wherein said kneaded dough further comprises a yeast.

2. A method of manufacturing dough for yeast-leavened foods, which comprises:
   (1) (i) kneading an entirety of starting materials comprising at least farina under reduced pressure to form a kneaded mass; or
      (ii) kneading an entirety of starting materials comprising at least farina under atmospheric pressure and subsequently extruding the kneaded mixture under pressure to form an extruded mass;
   (2) subsequently kneading said kneaded mass or said extruded mass under atmospheric pressure to obtain kneaded dough; and then
   (3) fermenting said kneaded dough, wherein said kneaded dough further comprises a yeast.

3. The method according to claim 1, wherein kneading under reduced pressure is performed at a reduced pressure of not greater than 600 mmHg.

4. The method according to claim 1, wherein said starting materials further comprise L-ascorbic acid.

5. The method according to claim 1, wherein the extrusion under pressure is performed at a pressure ranging from 0.1 to 100 kg/cm$^2$.

6. The method according to claim 1, which further comprises freezing the kneaded dough.

7. The method according to claim 4, wherein said L-ascorbic acid ranges from 5 to 100 ppm with respect to the entirety of the farina.

8. The method according to claim 1, wherein said staring material comprises 30% weight to 95% weight of said farina.

9. The method according to claim 1, wherein said farina is selected from the group consisting of wheat flour, rice flour, barley flour, oat flour, corn flour, barnyard millet flour, millet flour, sorghums flour, and common millet flour.

10. The method according to claim 1, wherein a yeast is added to said starting materials in step (1)(i) or step (1)(ii).

11. The method according to claim 10, wherein said yeast is either fresh yeast or dry yeast.

12. The method according to claim 10, wherein said starting material comprises 1% weight to 10% weight of said yeast.

13. The method according to claim 1, wherein said fermentation comprises incubating at a temperature of ranging from 30° C. to 60° C. and a humidity ranging from 40% to 95%.

14. The method according to claim 1, further comprising heat processing after said fermenting.

15. The method according to claim 14, wherein said heat processing is performed at a temperature ranging from 90° C. to 250° C.

16. The method according to claim 1, wherein a yeast is added to said remaining starting materials of step (2).

17. The method according to claim 16, wherein said yeast is either fresh yeast or dry yeast.

18. The method according to claim 16, wherein said starting material comprises 1% weight to 10% weight of said yeast.

19. The method according to claim 2, wherein kneading under reduced pressure is performed at a reduced pressure of not greater than 600 mmHg.

20. The method according to claim 2, wherein said starting materials further comprise L-ascorbic acid.

21. The method according to claim 20, wherein said L-ascorbic acid ranges from 5 to 100 ppm with respect to the entirety of the farina.

22. The method according to claim 2, wherein the extrusion under pressure is performed at a pressure ranging from 0.1 to 100 kg/cm$^2$.

23. The method according to claim 2, wherein said staring material comprises 30% weight to 95% weight of said farina.

24. The method according to claim 2, wherein said farina is selected from the group consisting of wheat flour, rice flour, barley flour, oat flour, corn flour, barnyard millet flour, millet flour, sorghums flour, and common millet flour.

25. The method according to claim 2, wherein said starting materials further comprise a yeast.

26. The method according to claim 25, wherein said yeast is either fresh yeast or dry yeast.

27. The method according to claim 25, wherein said starting material comprises 1% weight to 10% weight of said yeast.

28. The method according to claim 2, wherein said fermentation comprises incubating at a temperature of ranging from 30° C. to 60° C. and a humidity ranging from 40% to 90%.

29. The method according to claim 2, further comprising heat processing after said fermenting.

30. The method according to claim 29, wherein said heat processing is performed at a temperature ranging from 90° C. to 250° C.

31. The method according to claim 2, which further comprises freezing the kneaded dough.

* * * * *